(12) United States Patent
Ichikawa et al.

(10) Patent No.: US 7,252,585 B2
(45) Date of Patent: Aug. 7, 2007

(54) WORK-VEHICLE CABIN HAVING AIR-CONDITIONING UNIT

(75) Inventors: Nobushige Ichikawa, Sakai (JP); Kentaro Nakamura, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/796,800

(22) Filed: Mar. 9, 2004

(65) Prior Publication Data

US 2005/0005532 A1    Jan. 13, 2005

(30) Foreign Application Priority Data

Jun. 12, 2003 (JP) .............................. 2003-167775
Jun. 12, 2003 (JP) .............................. 2003-167776
Jun. 30, 2003 (JP) .............................. 2003-188003

(51) Int. Cl.
*B60H 1/00* (2006.01)
(52) U.S. Cl. ..................... 454/137; 454/69; 454/139
(58) Field of Classification Search .............. 454/69, 454/136, 137, 138, 139, 156, 158
See application file for complete search history.

(56) References Cited

U.S. PATENT DOCUMENTS

| | | | | |
|---|---|---|---|---|
| 3,763,760 | A | * | 10/1973 | Erickson ..................... 454/145 |
| 3,868,896 | A | * | 3/1975 | Doll et al. ................... 454/137 |
| 4,189,987 | A | * | 2/1980 | Amberg et al. ............. 454/137 |
| 4,503,749 | A | * | 3/1985 | Kuhn et al. ................. 454/136 |
| 4,721,031 | A | * | 1/1988 | Nakata et al. .............. 454/121 |
| 4,874,036 | A | * | 10/1989 | Masuda ........................ 165/42 |
| 5,468,183 | A | * | 11/1995 | Hahn ........................... 454/136 |
| 5,499,947 | A | * | 3/1996 | Tauber ........................... 454/69 |
| 5,860,856 | A | * | 1/1999 | Teich et al. ................. 454/158 |
| 6,279,978 | B1 | * | 8/2001 | Schreyer et al. ........... 296/39.3 |
| 6,780,097 | B2 | * | 8/2004 | Shuttleworth et al. ...... 454/136 |
| 6,796,132 | B1 | * | 9/2004 | Hille et al. ..................... 62/89 |
| 6,932,694 | B2 | * | 8/2005 | Jeffries ........................ 454/145 |

FOREIGN PATENT DOCUMENTS

| | | |
|---|---|---|
| JP | 52-22899 | 2/1977 |
| JP | 55-19241 | 2/1980 |
| JP | 55-165321 | 11/1980 |
| JP | 58-54466 | 4/1983 |
| JP | 58-100108 | 7/1983 |
| JP | 2-148816 | 6/1990 |
| JP | 2-148816 | 12/1990 |
| JP | 7-40912 | 9/1995 |
| JP | 8-216672 | 8/1996 |
| JP | 2000-175543 | 6/2000 |
| JP | 2001-39153 | 2/2001 |
| JP | 2002-61936 | 2/2002 |
| JP | 2002-275941 | 9/2002 |
| JP | 2002-347666 | 12/2002 |
| JP | 2003-49449 | 2/2003 |
| KR | 1998-055411 | 10/1998 |

* cited by examiner

*Primary Examiner*—Gregory Wilson
(74) *Attorney, Agent, or Firm*—The Webb Law Firm

(57) ABSTRACT

A work-vehicle cabin having an air-conditioning unit is disclosed. The cabin includes a roof unit, a downwardly bulging ceiling portion constituting a part of the roof unit, a heater provided in the ceiling portion, an evaporator provided in the ceiling portion and arranged adjacently rearwardly of the heater, and a pair of forward air-supply openings provided in the ceiling portion and respectively disposed laterally of the heater for feeding conditioned air to the inside of the cabin.

20 Claims, 12 Drawing Sheets

WORK-VEHICLE CABIN HAVING AIR-CONDITIONING UNIT

BACKGROUND OF THE INVENTION

1. Field of the Invention

The present invention relates to a work-vehicle cabin having an air-conditioning unit mounted to a ceiling portion of the cabin, the air-conditioning unit having a heater and an evaporator.

2. Description of the Related Art

A work-vehicle cabin having an air-conditioning unit is known from Japanese Patent Application "Kokai" No.: Hei. 8-216672 (see paragraph [0020], FIGS. 1 and 2). In this, a downwardly bulging ceiling portion includes a forward air-supply opening, rearwardly of which there is disposed an air-conditioning unit for feeding conditioned air to this forward air-supply opening. In the case of this conventional cabin, the forward air-supply opening and the air-conditioning unit are disposed one behind the other. So, the air-conditioning unit projects rearward significantly. As a result, the rear end the downwardly bulging ceiling portion extends to a position upwardly of a driver's seat, thus compromising roominess of the cabin and driver's comfort. Further, in this cabin, for connecting a front air-conditioning duct for guiding conditioned air to right and left ends and lateral air-conditioning ducts for receiving the conditioned air from the front air-conditioning duct, inclined flanges provided in the respective ducts is employed (paragraph [0018], FIG. 3). This connecting construction using inclined flanges tends to result in displacement between the flanges, which leads eventually to air leak from the connection.

For mounting the air-conditioning unit in the work-vehicle cabin, a shutter mechanism is required as a damper for switching between indoor air and outdoor air. In this regard, Japanese Patent Application "Kokai" No.: Hei. 2-148816 (page 5, line 12 through page 6, line 15) discloses a construction wherein this shutter is supported to be pivotable about a lateral axis to be raised and lowered and for this shutter, a knob acting as a switchover mechanism is connected via a push/pull wire, so that the shutter is switched over by an operator's pulling/pushing the wire with gripping the knob. With such air switchover damper, when this damper is set to a first condition for introducing outdoor air by closing an air circulating opening, if an operator entering or exiting the cabin opens the entrance door of the cabin and then closes it again, this closing action causes momentary compression of the air inside the cabin, and this increased inside pressure may automatically or inadvertently switch over the damper from the first condition to a second condition. In order to avoid such inadvertent switchover, it is necessary to provide a moving resistance to the operational portion of the knob, so that the damper may effectively resist such automatic switchover. In this case, the resistance gives a heavy feel for the operator in the switchover operation.

As disclosed by e.g. Japanese Patent Application "Kokai" No.: 2000-347666 (paragraph [0016], FIGS. 1 and 2), the work-vehicle cabin often includes, at right and left sides thereof, windows which can be opened to the outside In such construction, because of insufficient overlap of the roof portion over these windows, there tends to occur blowing-in of raindrops or the like when the windows are opened to the outside.

SUMMARY OF THE INVENTION

A primary object of the present invention is to overcome the above-described of the conventional work-vehicle cabin having an air-conditioning unit. One particular object is to provide an improved air-conditioning duct construction with reduced risk of air leak, with avoiding enlargement of the cabin per se while securing maximum free space inside the cabin.

Another object of the invention is to prevent the inadvertent switchover of the damper when an operator gets in/out of the cabin.

Still another object is to restrict blowing-in of raindrops or the like when the windows provided on the opposed lateral sides of the cabin are open to the outside.

For accomplishing the above-noted object, according to one aspect of the present invention, a work-vehicle cabin having an air-conditioning unit, comprises: a roof unit; a downwardly bulging ceiling portion constituting a part of the roof unit; a heater provided in the ceiling portion; an evaporator provided in the ceiling portion and arranged adjacently rearwardly of the heater; and a pair of forward air-supply openings provided in the ceiling portion and respectively disposed laterally of the heater for feeding conditioned air to the inside of the cabin.

With this construction, the pair of forward air-supply openings are arranged in distribution near the right and left ends of the ceiling portion, leaving free space therebetween in the right/left direction and in this free space, the heater is arranged. Hence, the heater and the evaporator are disposed more forwardly than those in the conventional construction. As a result, the rear end of the downwardly bulging ceiling portion may be formed more forwardly, forming greater space or distance between the rear face of the downwardly bulging ceiling portion and the driver's seat in the cabin. The construction can increase the overhead space for the driver (seated at the driver's seat), thus creating comfortable space, without inviting enlargement of the entire cabin.

According to a further preferred embodiment of the present invention, said roof unit includes an inner roof portion located on the inner side and an outer roof portion located on the outer side of the inner roof portion, the roof unit includes on a lateral side thereof a lateral air-supply opening for feeding the conditioned air to the inside of the cabin and a lateral air-conditioning duct for guiding the conditioned air to the lateral air-supply opening bound between the inner roof portion and the outer roof portion.

With the above construction, the lateral air-conditioning duct interposed between the inner roof portion and the outer roof portion is bound and fixed between these inner and outer roof portions, without requiring any special fixing tools or fixing means such as welding (even if a special fixing tools are used, only a few of them will be needed. Further, even when the fixing means such as welding is employed, this fixing means may be provided at only a few positions).

According to a still further preferred embodiment of the invention, forwardly of the lateral air-conditioning duct, there is provided a forward air-conditioning duct for guiding the conditioned air from the air-conditioning unit, a feeding portion of the forward air-conditioning duct and a forward receiving portion of the lateral air-conditioning duct are respectively formed as cylindrical portions, a cutout is formed at a leading end of a large-diameter one of the cylindrical portions of the feeding portion of the forward air-conditioning duct and the forward receiving portion of the lateral air-conditioning duct, the small-diameter one of the cylindrical portions of the feeding portion of the forward air-conditioning duct and the forward receiving portion of the lateral air-conditioning duct is inserted and engaged into the other large-diameter cylindrical portion, and a cover member for covering said cutout fixes said feeding portion or said forward introducing portion acting as said large-diameter cylindrical portion under said inserted engaged condition.

With the above construction, the connecting portions of the ducts are formed as cylinder portions of different diameters and a cutout is provided in the leading end of the large-diameter cylindrical portion (the forward air-conditioning duct or the lateral air-conditioning duct). Then, by setting this cutout in parallel at a position corresponding to the other cylindrical portion (the lateral air-conditioning duct or the forward air-conditioning duct) and then moving this into a condition normal to the axis thereof, the other cylindrical portion will be engaged via this cutout into the cylindrical portion of the large-diameter cylindrical portion. Under this condition, the cover member will be fitted over the other cylindrical portion so as to close the cutout, whereby the to ducts are connected to each other. With this connecting construction, the displacement in the connecting construction can be reduced, hence the air leak can be reduced also.

For accomplishing the above-noted object, according to a further aspect of the present invention, a work-vehicle cabin having an air-conditioning unit, comprises:

an air communicating passage for guiding air introduced through an outdoor air introducing opening to the air-conditioning unit;

an air-supply opening for feeding conditioned air conditioned by the air-conditioning unit to the inside of the cabin;

an air circulating opening communicating between the inside of the cabin and the air communicating passage, air inside the cabin being introduced through the air circulating opening to the air communicating passage and then conditioned by the air-conditioning unit, which then returns the conditioned air through the air-supply opening to the inside of the cabin;

an indoor/outdoor air switchover damper for selectively providing a first condition in which the damper closes said air circulating opening for guiding the outdoor air introduced through the outdoor air introducing opening to the air-conditioning unit via the air circulating passage and a second condition in which the damper opens said air circulating opening and closes said outdoor air introducing opening for inhibiting introduction of the outdoor air into the air circulating passage;

said indoor/outdoor air switchover damper including;
a shielding portion which can be gapless-ly attached to an opening edge of the other member and which is elastically deformable, and
a pivotable base end portion for supporting the shielding portion; and
a switchover mechanism for switching over the indoor/outdoor switchover damper between said first condition and said second condition.

With the cabin having the above-described construction, as the damper construction, there is employed the elastically deformable shielding portion. Then, as this shielding portion is gapless-ly attached to the opening edge of the other member, even if there occurs a momentary build-up in the inside pressure of the cabin in association with an opening/closing of the door during an operator's getting in/out of the cabin, the shielding portion will be elastically deformed to form a gap relative to the opening edge, through which gap the inside pressure may be released, upon which the inside pressure of the cabin will return to the normal. And, under this gap-forming condition of the shielding portion, the base end portion of the damper remains closed, so that upon reduction of the inside pressure of the cabin, the shielding portion will automatically return to the closing condition. In this way, this construction does not require the means for providing increased resistance in the switchover mechanism, but can maintain good operational feel, with reduced risk of inadvertent switchover of the indoor/outdoor air switchover damper.

According to one preferred embodiment of the present invention, said shielding portion comprises an assembly of a plurality of rubber plates affixed to each other, leading ends and base ends of the rubber plates being bonded together, intermediate portions between the leading ends and the base ends thereof being un-bonded.

With the above construction, the intermediate portions of the shielding portion are un-bonded. Hence, while this shielding portion has a high strength as being formed as an assembly of a plurality of rubber plates affixed to each other, the intermediate portions thereof are un-bonded, so that the shielding portion can be elastically deformed at these un-bonded intermediate portions thereof. Accordingly, this construction can provide sufficient function for closure, yet can be elastically deformed also.

According to a further embodiment of the invention, said shielding portion comprises an assembly of a plurality of rubber plates affixed to each other, base ends of the rubber plates being bonded together, leading ends thereof being un-bonded.

With the above construction, this shielding portion has a high strength as being formed as an assembly of a plurality of rubber plates affixed to each other. The base ends thereof are bonded together, thus ensuring sufficient strength for these base ends subjected to a high load. Whereas, the leading ends are un-bonded for allowing elastic deformation.

According to a still further embodiment of the invention, said shielding portion comprises a single rubber sponge plate.

The above construction can provide the function required as a damper and can provide the ability of elastic deformation also and can contribute to simplification of the construction.

According to a still further embodiment of the invention, a detent mechanism is provided at said base end portion for setting an opening condition of the shielding portion.

With the above construction, by means of the detent mechanism, the damper can be set to an intermediate condition where the damper affects neither the outdoor air introducing opening nor the air circulating opening. As a result, it becomes possible to mix the indoor air inside the cabin with the outdoor air, so that temperature and/or humidity adjustment of the air becomes possible. Hence, in addition to the conditioning by the air-conditioning unit, additional conditioning of the air through adjustment of the opening degree of the damper becomes possible also.

According to a still further embodiment of the present invention, at the base end portion, there are provided a manual switchover lever as a switchover control mechanism and an engaging recess of said detent mechanism.

With the above construction, the base end portion of the damper is utilized for providing the manual switchover lever and the engaging recess of the detent mechanism. Hence, the base end portion can be used also as the attaching portion for the manual switchover lever and the part of the detent mechanism. As a result, the construction can be simplified.

For accomplishing the above-noted object, according to a still further aspect of the present invention, a work-vehicle cabin having an air-conditioning unit, comprises:

a roof unit;

a ceiling portion constituting a part of said roof unit;

right and left side portions;

windows provided at said right and left side portions, said windows being openable to the outer side;

an eaves portion formed as lateral extensions of said roof unit for covering said windows from above when the windows are opened;

a heater provided in said ceiling portion;

an evaporator provided in said ceiling portion; and a forward air-supply opening provided in said ceiling portion for feeding conditioned air to the inside of the cabin.

With the cabin having the above-described construction, the roof unit disposed upwardly of the windows is effectively utilized. In particular, this room unit is extended laterally (to the right and left) in the form of eaves to the positions above the windows. Hence, this extended eaves portions can cover the outwardly opened windows from above, thus preventing intrusion of raindrops or the like into the cabin. With this effective prevention of intrusion of raindrops or the like, the windows can be freely opened to the outside for ventilation without inviting the inconvenience of the intrusion. And, this construction can be readily realized only by extending the existing roof unit laterally in the form of eaves.

According to one preferred embodiment of this type of cabin, the cabin further comprises lamps disposed on the right and left sides thereof under said eaves portion.

With the above construction, the roof unit is extended in the form of eaves for preventing intrusion of raindrops or the like through the outwardly opened windows. Then, by effectively utilizing these extended eaves portions, and under these right and left eaves portions, there are disposed the pair of right and left lamps. So that, under the protection afforded by the eaves portions, the lamps can be arranged with a maximum distance from the cabin body in the right/left direction, thus providing a large illumination area on each lateral side of the cabin.

According to a still further embodiment of the present invention, said cabin further comprises a rear window and said right and left lamps are disposed on the right and left sides of the rear window, said rear window being pivotally openable upwardly and rearwardly.

With this construction, by effectively utilizing the right and left eaves portions, the right and left lamps are disposed with a large right/left distance therebetween. This makes it easier to support the rear window disposed between the right and left lamps to be pivotable upwardly and rearwardly and makes it also possible to maximize the width of the rear window.

Further and other features and advantages of the present invention will become apparent upon reading the following detailed disclosure of the preferred embodiments thereof with reference to the accompanying drawings.

DESCRIPTION OF THE PREFERRED EMBODIMENTS

Figure 1:
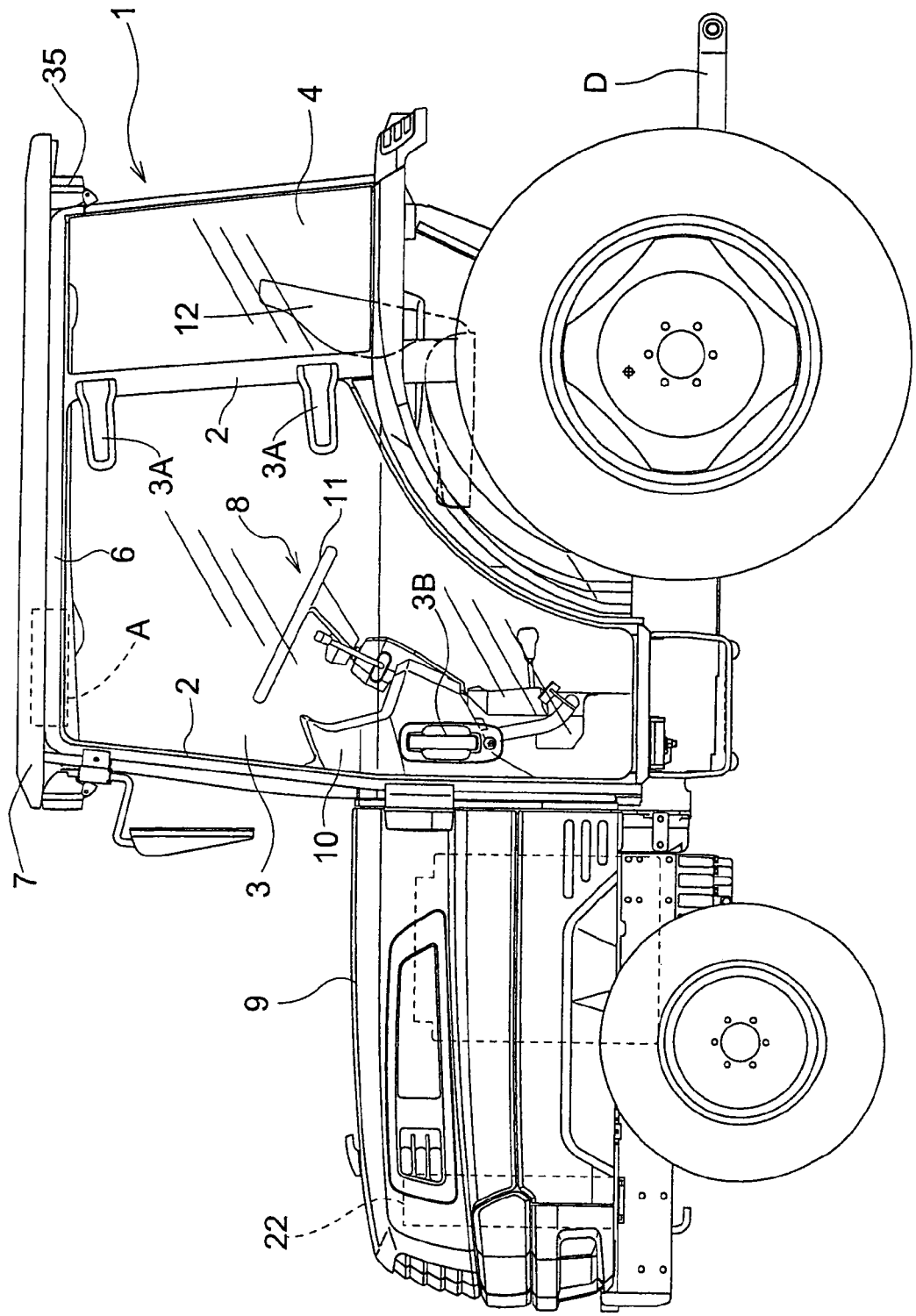
FIG. 1 is an overall side view of a tractor.
Figure 6:
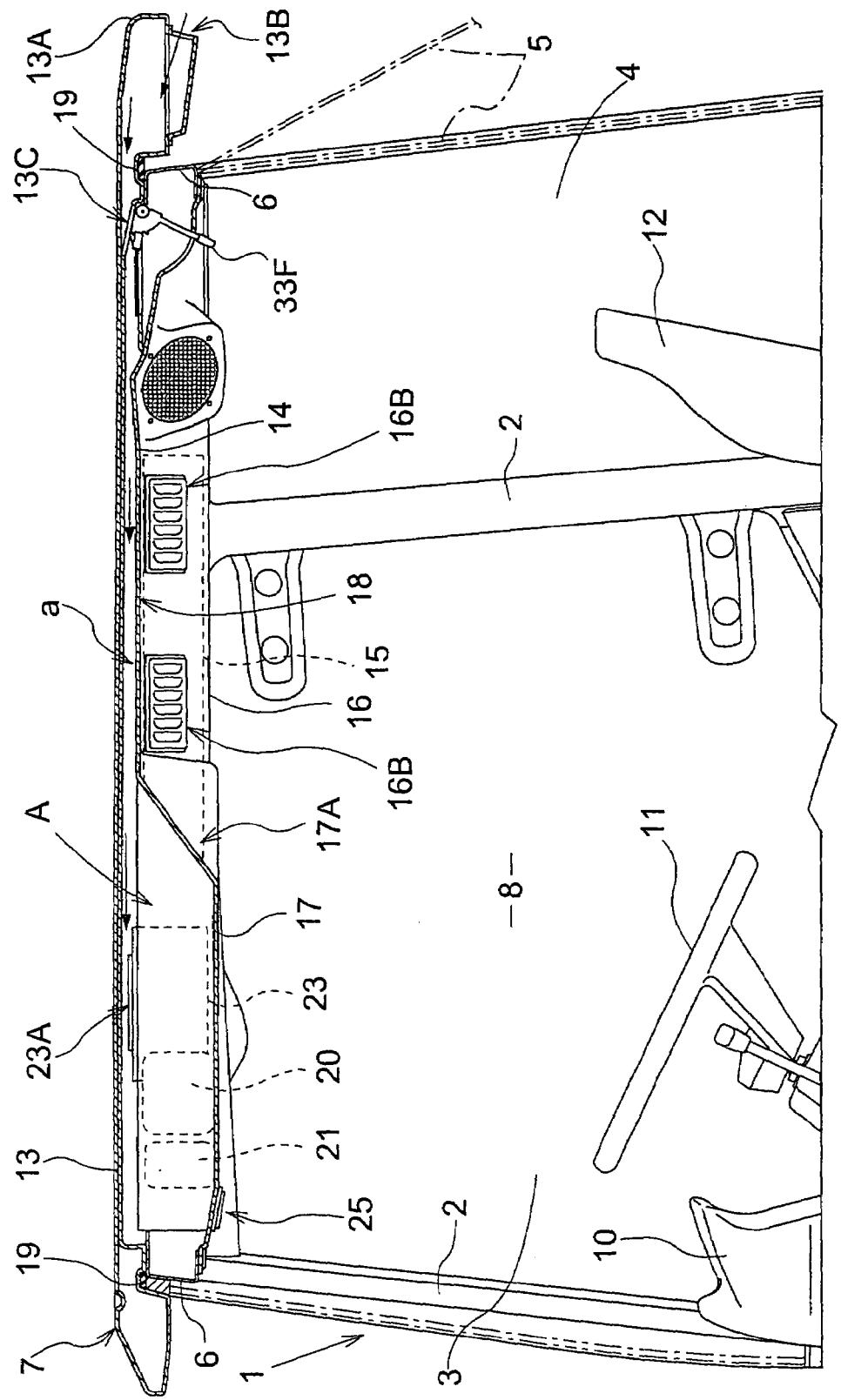
FIG. 6 is a side view in vertical section of the inner roof portion.

As an example of a work vehicle, an agricultural tractor will be described. A cabin 1 of this agricultural tractor, as shown in FIGS. 1 and 6, includes a plurality of struts 2 for the cabin, a driver's access side door 3 having a transparent glass face covering a portion surrounded by the struts 2, a rear side window 4, a rear window 5, an upper frame 6 extending over the top plane of the respective struts 2, and a roof unit 7 mounted on the upper frame 6.

Inside the cabin 1, there is provided a driver's section 8. In this driver's section 8, there is disposed a steering wheel 11 mounted on a handle post 10 located adjacent an engine hood 9, and a driver's seat 12 is disposed behind the handle post 11.

The roof unit 7 incorporates therein an air-conditioning unit A for conditioning air inside the cabin 1. To the rear end of the agricultural tractor, there is mounted a lift link mechanism for lifting up/down an implement such as a cultivator relative to the traveling vehicle body.

The construction of the roof unit 7 will be described next.

Figure 2:
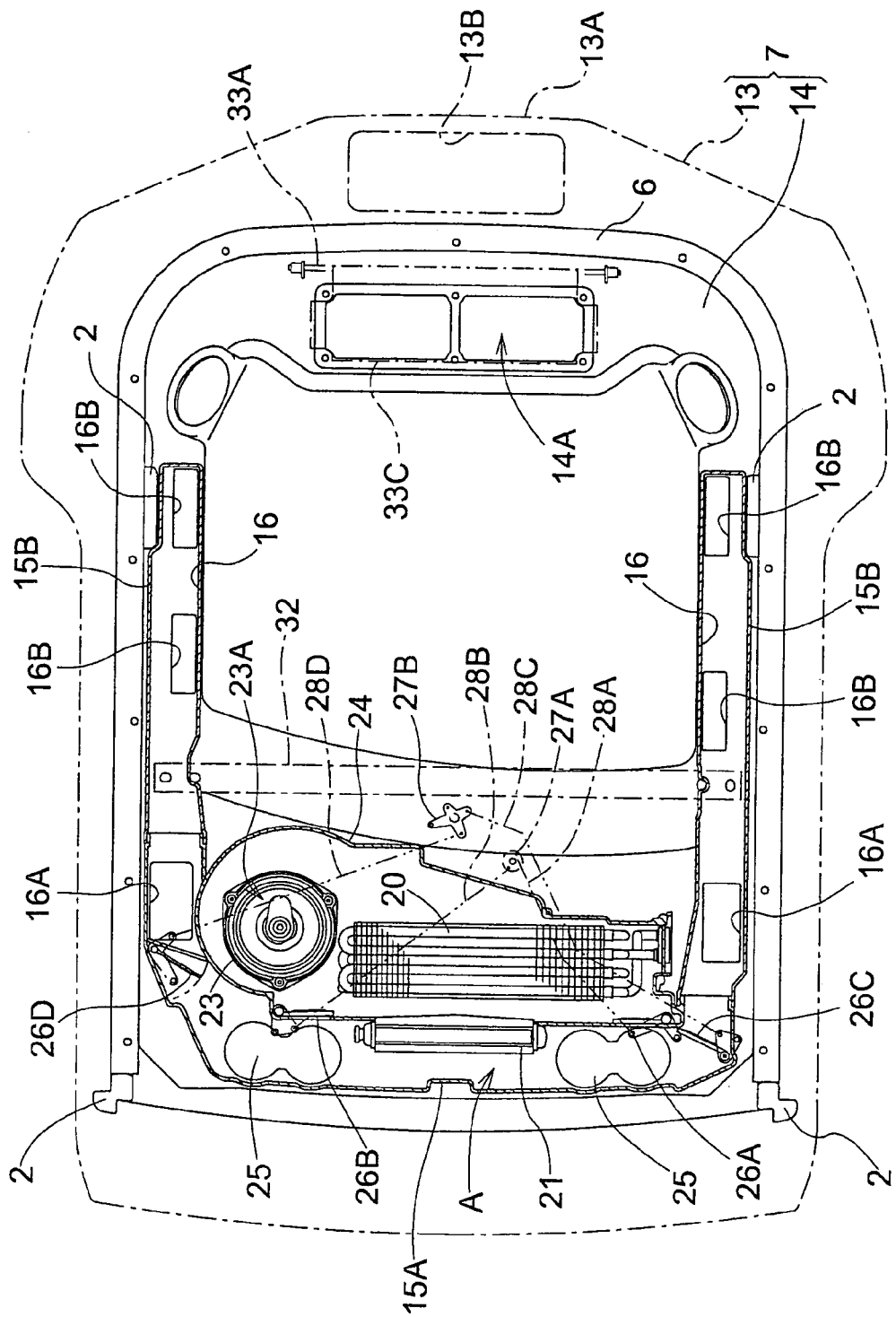
FIG. 2 is a plan view in horizontal section showing inside of an inner roof portion as seen from an outer roof portion.
Figure 3:
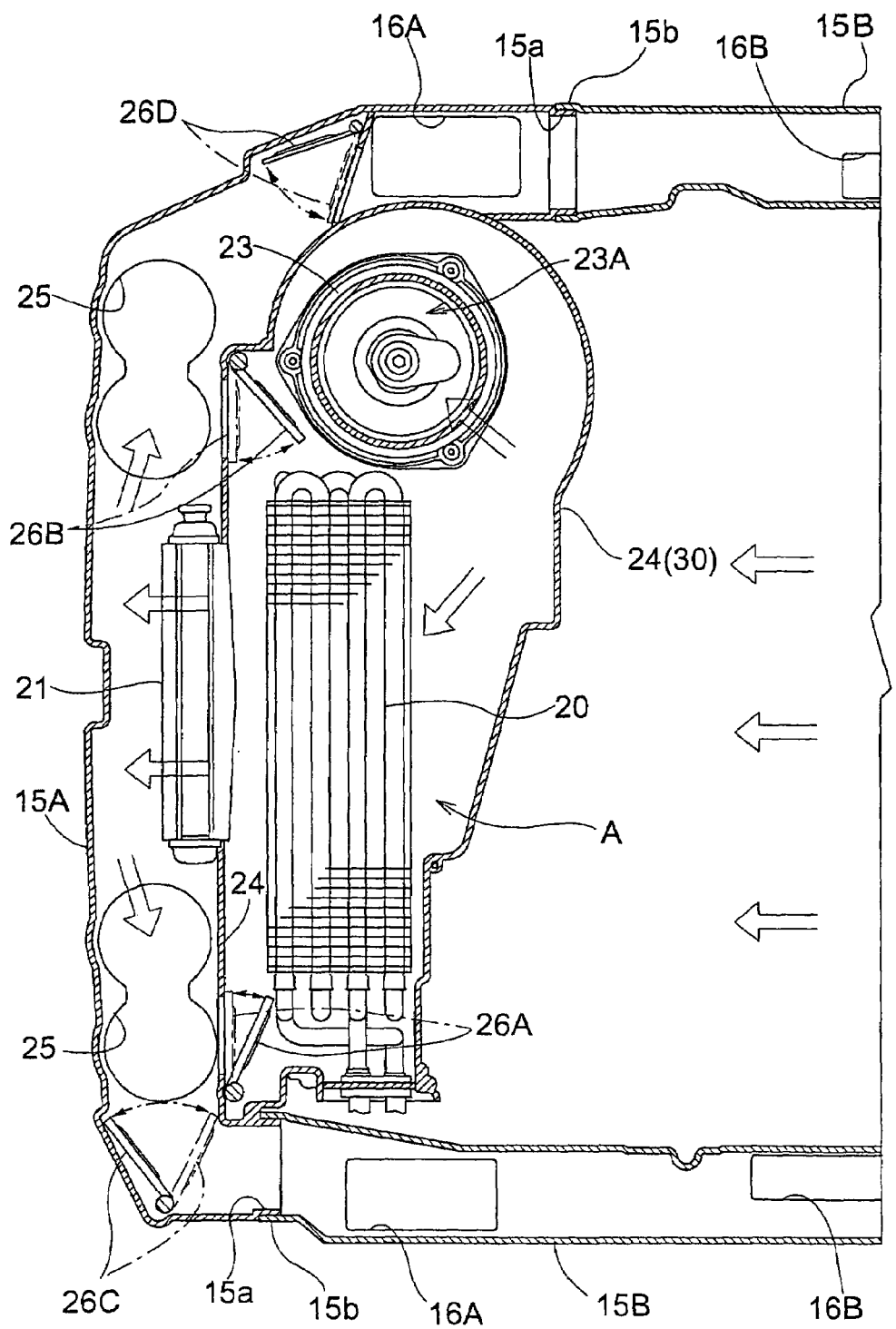
FIG. 3 is a plan view in partially enlarged horizontal section of the construction shown in FIG. 2.

As shown in FIGS. 1–6, the roof unit 7 consists essentially of an outer roof portion 13 and an inner roof portion 14, each of which is supported and attached to the upper frame 6. The inner roof portion 14 is an integral component formed of resin. A front half portion 17 located upwardly of the handle post 10 is formed as a downwardly bulging ceiling portion. And, the air-conditioning unit A is accommodated within this downwardly-bulging ceiling portion. As shown in FIG. 3, the front half portion 17 includes a forward air-conditioning duct 15A for guiding conditioned air from the air-conditioning unit A to the right and left lateral sides. Further, from the right and left sides of the front half portion 17, there are extended rearward, at an approximately same overhead height, side storage portions 16, 16 as lateral portions for lateral air-conditioning ducts 15B. An intermediate portion 18 surrounded by the front half portion 17 and the opposed lateral side storage portions 16, 16 is located above the driver's seat 12, and this intermediate portion 18 is located higher (greater overhead height) than the front half portion 17 and the opposed side storage portions 16, 16.

Figure 5:
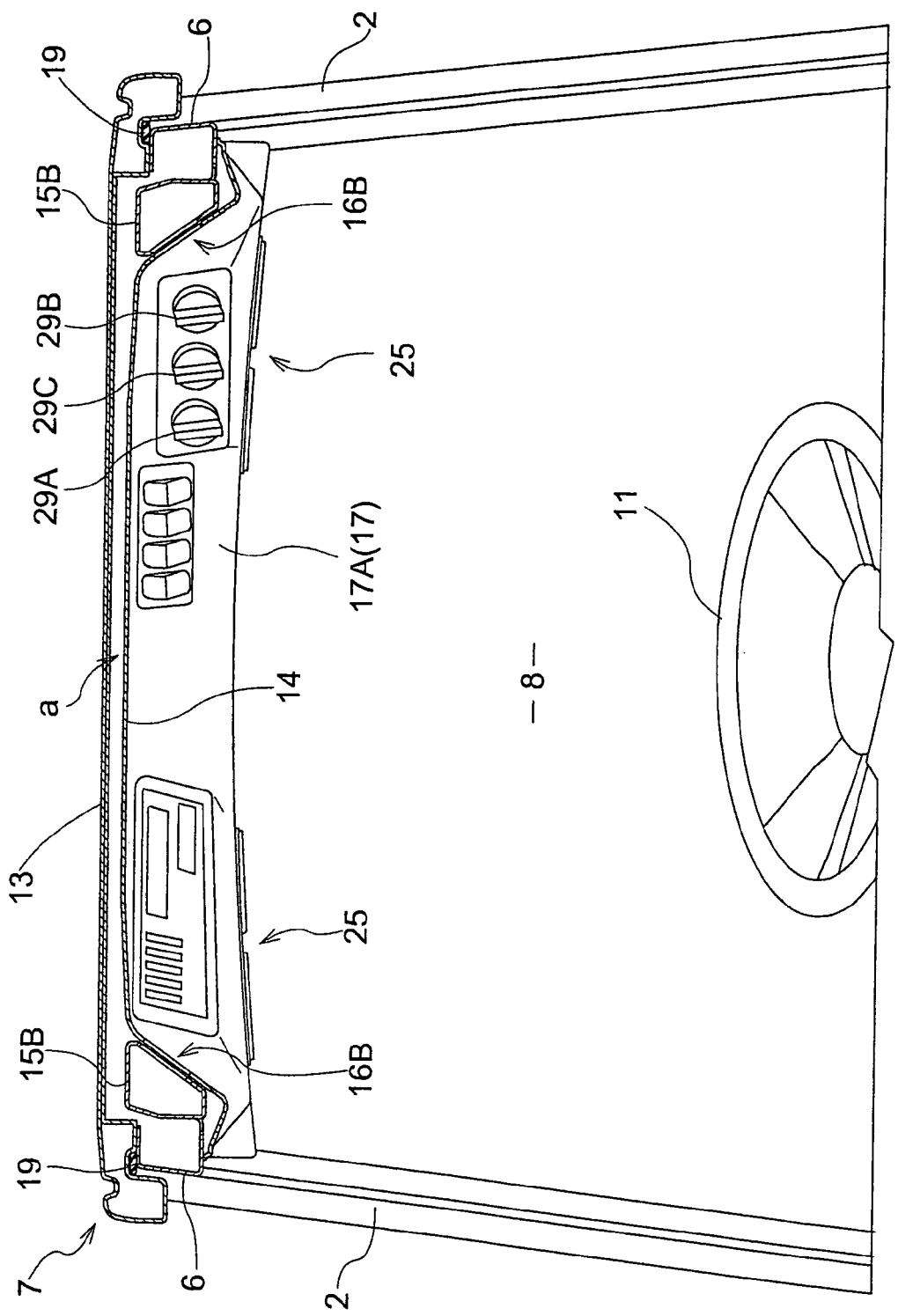
FIG. 5 is a rear view showing switches provided on a downwardly bulging ceiling portion.

As shown in FIG. 5 and FIG. 6, the outer roof portion 13 is mounted on the top face of the upper frame 6 and is formed as a flat plate having a greater area than the mounting area of the upper frame 6. To the downward-oriented face of the outer roof portion 13, there is attached a seal ring 19 having an annular shape and a rectangular cross section. Then, when the outer roof portion 13 is mounted on the upper frame 6, a cross sectional portion of the seal ring 19 comes into contact with the top face of the upper frame 6, thus blocking air communication with the outside. The outer roof portion 13 includes a rear eaves portion 13A projecting rearward from the upper frame 6, and the bottom face of this rear eaves portion 13A includes an outdoor air introducing opening 13B, and at a position inner side of the seal ring 19, there is formed an outdoor air-supply opening 13C communicating with the outdoor air introducing opening 13B.

In operation, the outdoor air introduced from the outdoor air introducing opening 13B is guided through the outdoor air supply opening 13C into the air-conditioning unit A.

Next, the inner construction of the inner roof portion 14 will be described. As shown in FIGS. 1–6, the air-conditioning unit A includes an evaporator 20 disposed in the lower front half portion 17 of the inner roof portion 14 and located above the handle post 10 and a heater 21 disposed forwardly of the evaporator 20. The evaporator 20 constitutes a cooling medium circulating circuit in cooperation with other unillustrated components including a compressor, an expansion valve, a condenser, etc. The heater 21 is connected via piping to a radiator 22 disposed within the engine hood 9.

On the right side of the evaporator 20, there is provided a sirocco fan 23 for feeding the outdoor air introduced from the outdoor air supply opening 13C to the evaporator 20 and the heater 21.

As shown in FIG. 6, the outdoor air discharged from the outdoor air supply opening 13C is guided under a suction effect through a passage provided by a space (a) formed between the downwardly oriented face of the outer roof portion 13 and the upward oriented face of the inner roof portion 14 to an inlet 23A of the sirocco fan 23 surrounded by a partition wall 24.

As shown in FIGS. 2 and 3, on the right and left sides of the heater 21, there are provided forward air-supply openings 25, 25 for feeding conditioned air to the inside of the cabin 1, so that the air may be discharged to the right and left sides of the handle post 10 having the steering wheel 11.

As shown also in FIGS. 2 and 3, the evaporator 20 and the sirocco fan 23 are housed within an air-conditioning unit housing 30 surrounded by the partition wall 24. This partition wall 24 is connected to the right and left ends of the rear face of the heater 21. The partition wall 24 and the front wall together form a forward air-conditioning duct 15A. On the opposed sides of the heater 21, there are formed openings for the forward air-conditioning duct 15A, in which right and left openings there are provided right and left first dampers 26A, 26B. At outlets 15a adjacent these two first dampers 26A, 26B and on the opposed lateral ends of the forward air-conditioning duct 15A, there are provided a pair of right and left second dampers 26C, 26D for introducing the conditioned air to front inlets 15b of the lateral air-conditioning ducts 15B, 15B.

As shown in FIG. 2, the first dampers 26A, 26B are operably coupled via a first drive arm 27A disposed at a mid position relative to the width of the vehicle body to right and left coupling rods 28A, 28B, so that these dampers may be opened/closed at the same time. As shown in FIG. 3, these dampers 26A, 26B are adjustable in their opening/closing degree. The conditioned air discharged from the sirocco fan 23 is subjected to a heat exchange at the evaporator 20 and then a further heat exchange with the heater 21. Then, this air is fed into the forward air-conditioning duct 15A to reach the right and left forward air-supply openings 25, 25 formed adjacent the right and left ends of this forward air-conditioning duct 15A.

As the forward air-supply openings 25, 25 are disposed adjacent the right and left ends, the conditioned air discharged therefrom can affect a large area of the front window (windshield) of the cabin 1, thereby to enhance the defogging effect for the front window face.

On the other hand, when the first dampers 26A, 26B are maintained under the closed condition, all of the conditioned air from the sirocco fan 23 is supplied after the heat exchange with the heater 21. In this, depending on the opening degree of the first dampers 26A, 26B, it is also possible to provide conditioned air directly to the forward air-supply openings 25, 25 without being subjected to the heat exchange with the heater 21. With this construction, it is possible to mix the hot conditioned air subjected to the heat exchange with the heater 21 and the cool conditioned air not subjected to the same, thus avoiding to supply extremely cool or cold air to the cabin.

As shown in FIG. 2, the second dampers 26C, 26D are operably coupled to the right and left second coupling rods 28C, 28D via a second drive arm 27B disposed adjacent the first drive arm 27A, so that these dampers may be opened/closed at the same time. These second dampers 26C, 26D can be only switched over between two positions of open and closed positions. Hence, these dampers provide the function of adjusting whether or not to introduce the conditioned air from the sirocco fan 23 and the conditioned fan past the heater 21 to the lateral air-conditioning ducts 15B, 15B.

The right and left lateral air-conditioning ducts 15B, 15B and the right and left side storage portions 16, 16 respectively storing these ducts 15B, 15B therein, as shown in FIG. 2, include, on the front side thereof, downward air-supply openings 16A, 16A and a pair of front and rear inclined air-supply openings 16B, 16B rearwardly of the downward air-supply openings 16A, 16A, so that the air may be discharged from the inclined air-supply openings 16B, 16B toward the face of the driver. These downward air-supply openings 16A and the inclined air-supply openings 16B are generically referred to as "lateral air-supply openings" herein.

Figure 4:
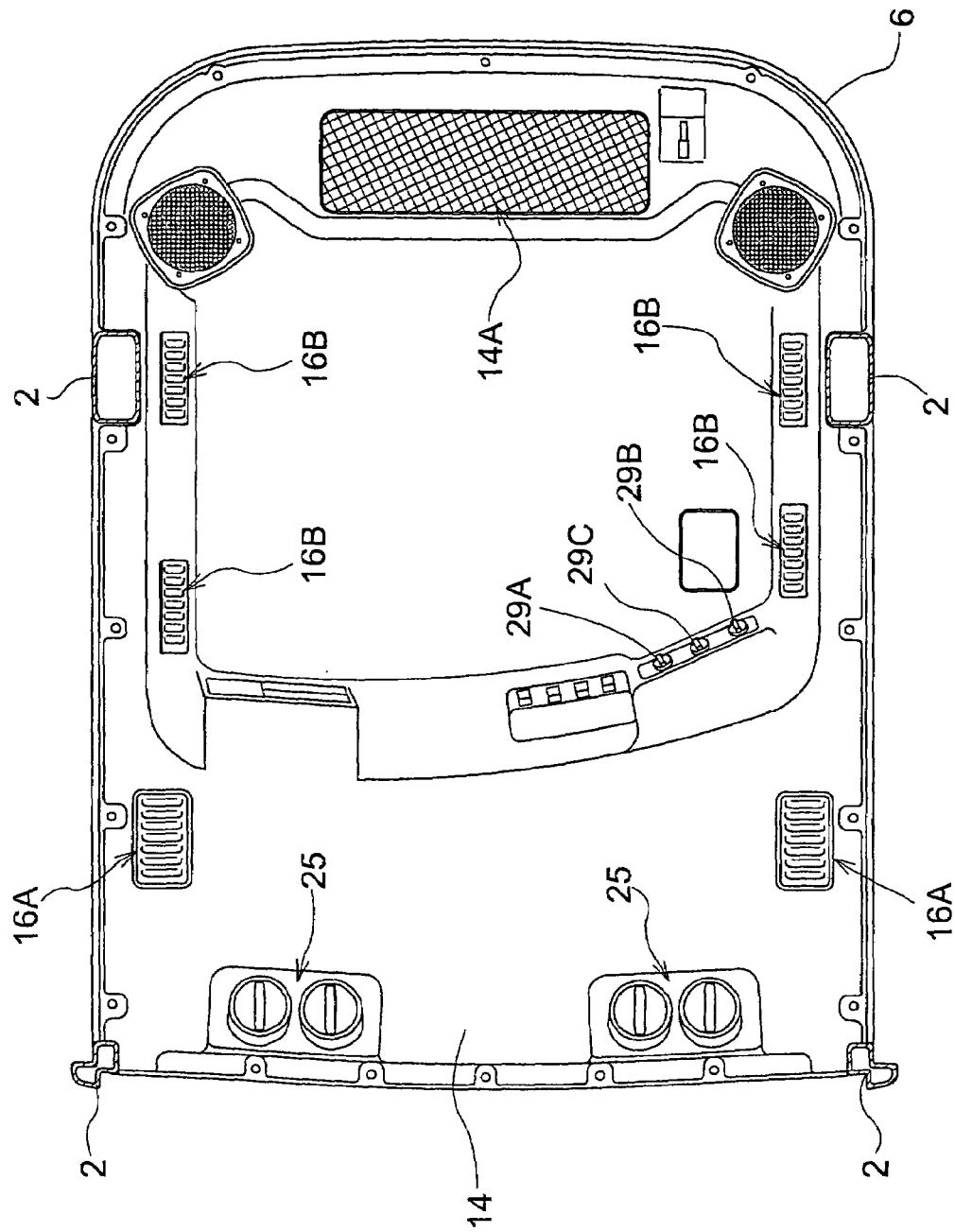
FIG. 4 is a bottom view showing a ceiling face of the inner roof portion as seen from inside a cabin.

As shown in FIGS. 2 through 4, on an inward oriented face 17A of the lowering wall of the front half portion 17 of the inner roof portion 145, there are provided various switches including an ON/OFF switch 29A for the air amount adjustment of the sirocco fan 23, a second damper switch 29C for opening/closing the second dampers 26C, 26D and a first damper switch 29B for the first dampers 26A, 26B, with these switches being disposed adjacent each other for facilitating operations thereof from the driver's seat 12.

As shown in FIGS. 4 through 6, an outdoor air introducing damper 33 is provided at an air circulating opening 14A formed at a rear end of the inner roof portion 14. This damper 33 can selectively provide a condition in which the outdoor air is introduced through the outdoor air introducing opening 13B to the space (a) formed between the inner roof portion 14 and the outer roof portion 13 and a further condition in which the outdoor air is blocked and the indoor air of the cabin is caused to circulate in the space (a) and the inside of the cabin.

As shown in FIG. 7, FIGS. 8A, 8B and FIG. 9, the outdoor air introducing damper 33 includes a pivot shaft 33A disposed rearwardly of the outdoor air introducing opening 13B and extending in the right/left direction within the inner roof portion 14, an attaching plate 33B attached to this pivot shaft 33A, and a shielding rubber 33C gaplessly fitted and fixed to the attaching plate 33B.

Figure 13:
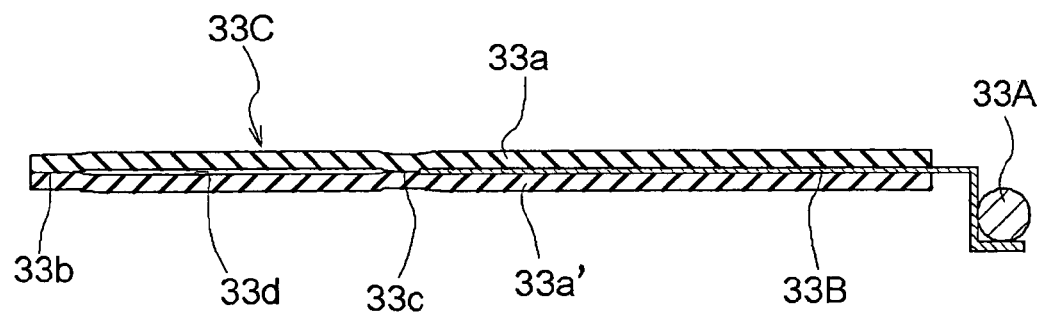
FIG. 13 is a cross-sectional elevated side view of an alternative embodiment of the shielding rubber or shielding portion of the damper.

With reference to FIG. 13 there is shown an alternative embodiment of the shielding rubber or shielding portion 33C. The shielding portion 33C, as shown in FIG. 13, has a plurality of plates 33a and 33a' affixed to each other. The leading ends 33b and base ends 33c of the shielding portion 33C are bonded together, whereas the intermediate portions 33d between the leading ends 33b and the base ends 33c are un-bonded.

Figure 14:
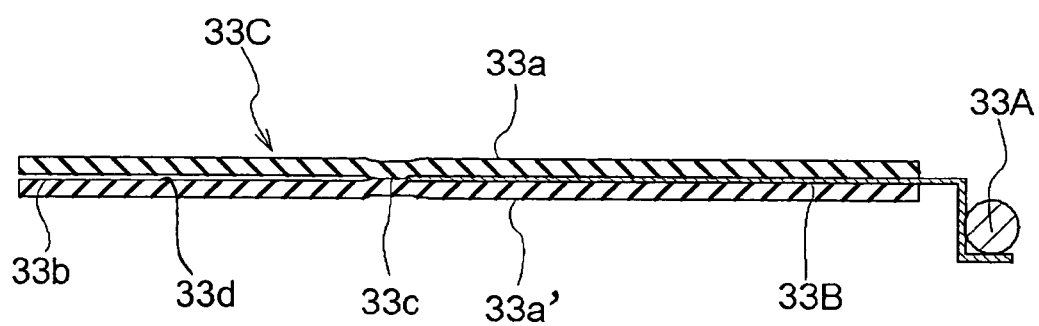
FIG. 14 is a view similar to view of FIG. 13 of another alternative embodiment of the shielding rubber or shielding portion of the damper.

With reference to FIG. 14 there is shown another alternative embodiment of the shielding rubber or shielding portion 33C. The shielding portion 33C, as shown in FIG. 14, has a plurality of plates 33a and 33a' affixed to each other. The base ends 33c of the shielding portion 33C are bonded together, whereas the leading ends 33b and the intermediate portions 33d between the leading ends 33b and the base ends 33c are un-bonded.

Figure 7:
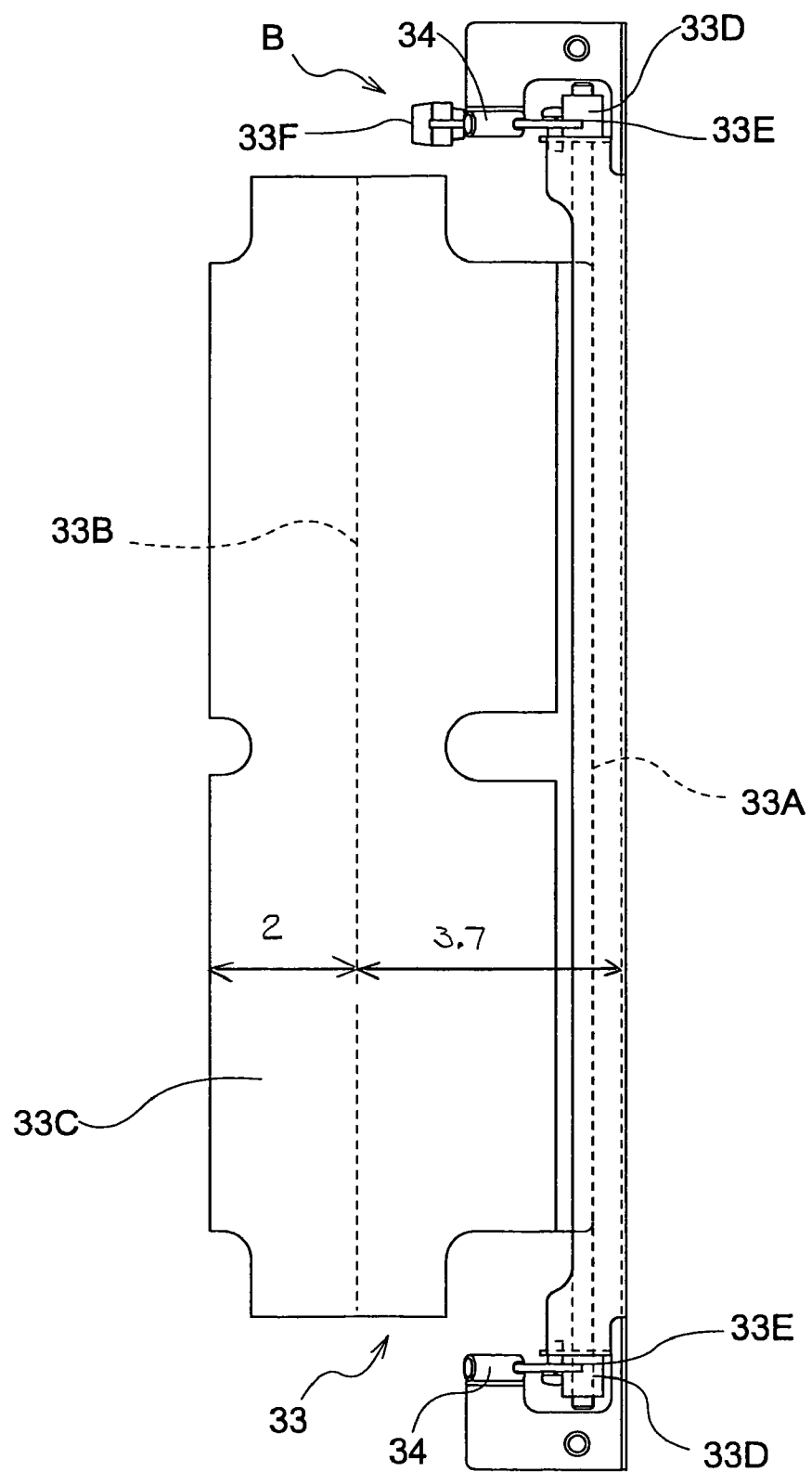
FIG. 7 is a plan view showing a damper for introducing outdoor air.
Figure 9:
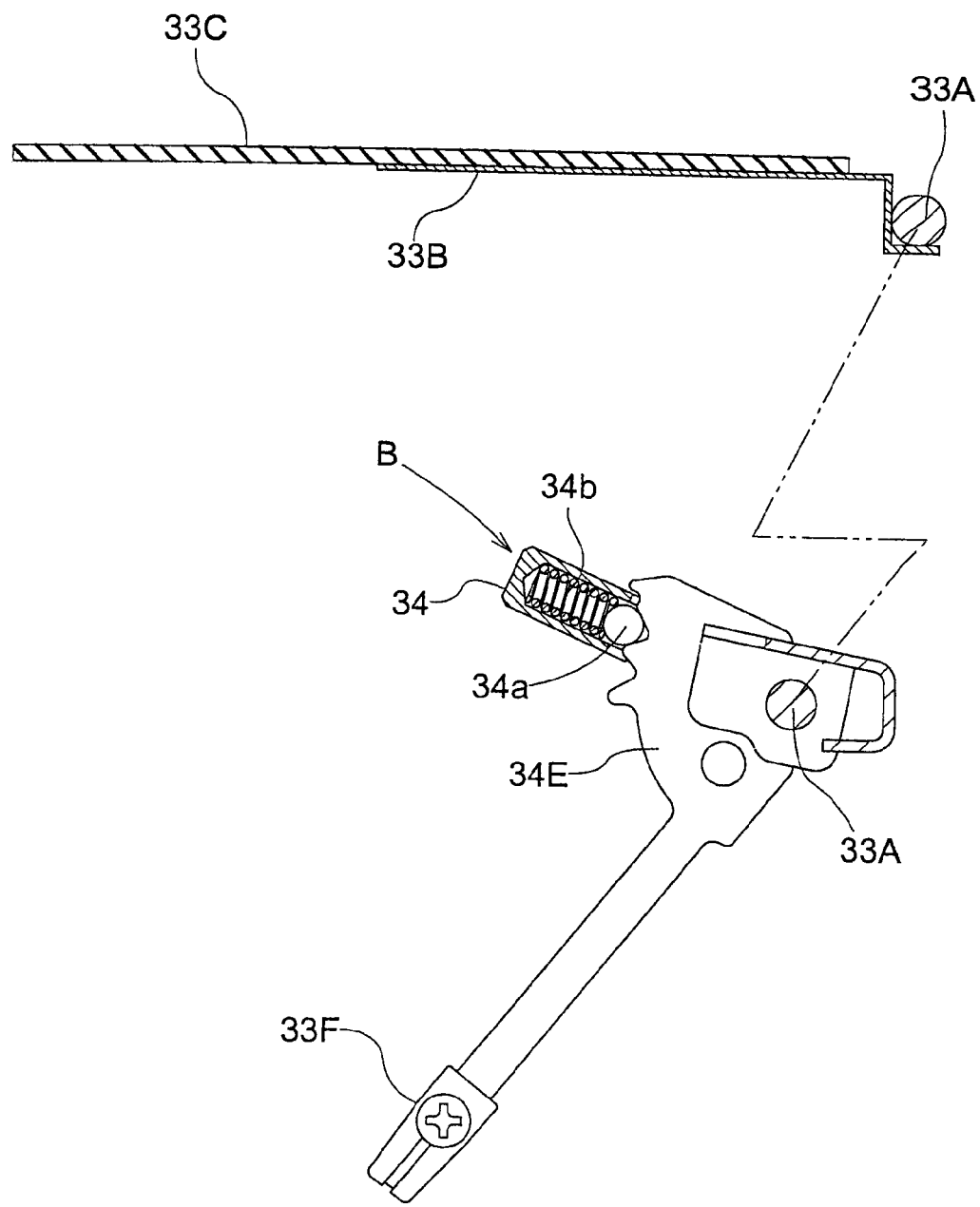
FIG. 9 is a partially cutaway side view showing the outdoor air introducing damper.

As shown in FIGS. 7 and 9, toothed plates 33E extend from right and left post portions 33D formed integrally with opposed ends of the pivot shaft 33A and fixing bosses 34 are provided in opposition to the toothed plates 33E. Each fixing boss 34 accommodates therein a ball 34a engageable with the tooth of the toothed plate 33E and a spring 34b for urging the ball 34a for projection. The toothed plate 33E, the ball 34a and the spring 34b together constitute a detent mechanism B.

From the toothed plate 33E, a manipulating arm 33F extends downward, so as to allow an opening-degree adjustment of the outdoor air introducing damper 33.

More particularly, as shown in FIG. 8, when the shielding rubber 33C is placed in contact with the outdoor air introducing opening 13C of the outer roof portion 13, introduction of outdoor air is inhibited. Under this condition, the air circulating opening 14a formed in the inner roof portion 14 is opened, so that the indoor air present inside the cabin 1 is introduced through this air circulating opening 14A to the space (a) between the inner roof portion 14 and the outer roof portion 13 to be conditioned and this conditioned air is again discharged through the respective air-supply openings back to the inside of the cabin 1.

Figure 8A:
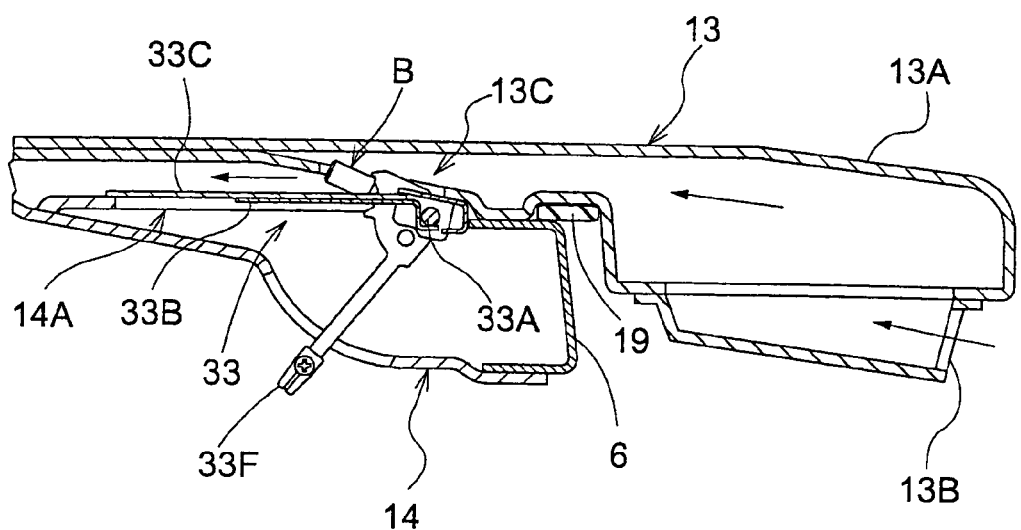
FIGS. 8A, 8B are side view sin vertical section showing respectively a condition wherein an air circulating opening is closed by an outdoor air introducing damper and a further condition wherein an outdoor air supply opening is closed by the damper.
Figure 8B:
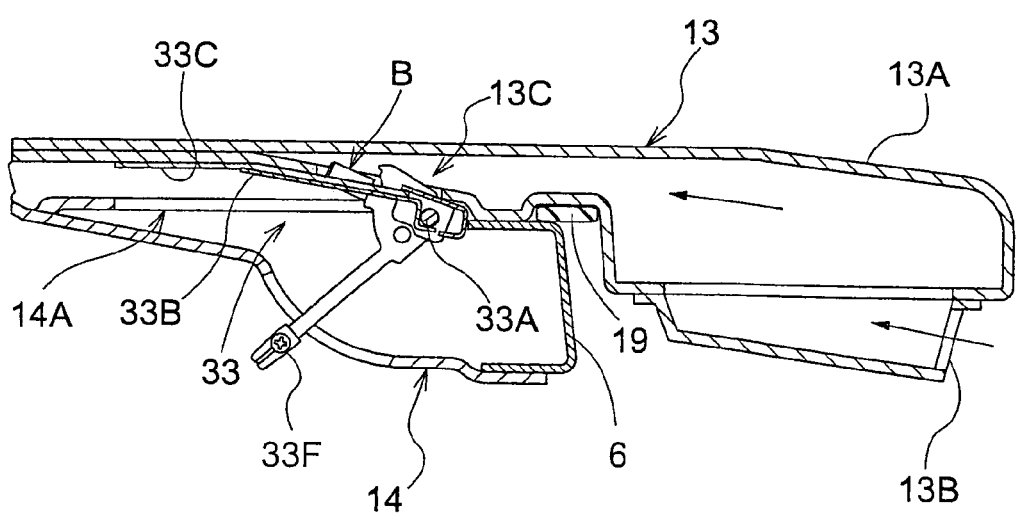

On the other hand, as shown in FIG. 8A, when the shielding rubber 33C is moved away from the outdoor air-supply opening 13C and the air circulating opening 14A is closed, the outdoor air alone can be introduced. Under this condition, the outdoor air is introduced through the outdoor air-supply opening 13C to the space (a) between the inner roof portion 14 and the outer roof portion 13 to be conditioned, and this conditioned outdoor air is discharged through the respective air-supply openings to the inside of the cabin 1.

Further, when the shielding rubber 33C is moved to a position away from both the outdoor air-supply opening 13C and the air circulating opening 14A, the indoor air from the cabin 1 and the outdoor air can be mixed and conditioned together, thereby to allow easy and fine adjustment of the temperature inside the cabin 1.

Next, the connecting construction of the air-conditioning ducts 15 will be described.

Figure 10:
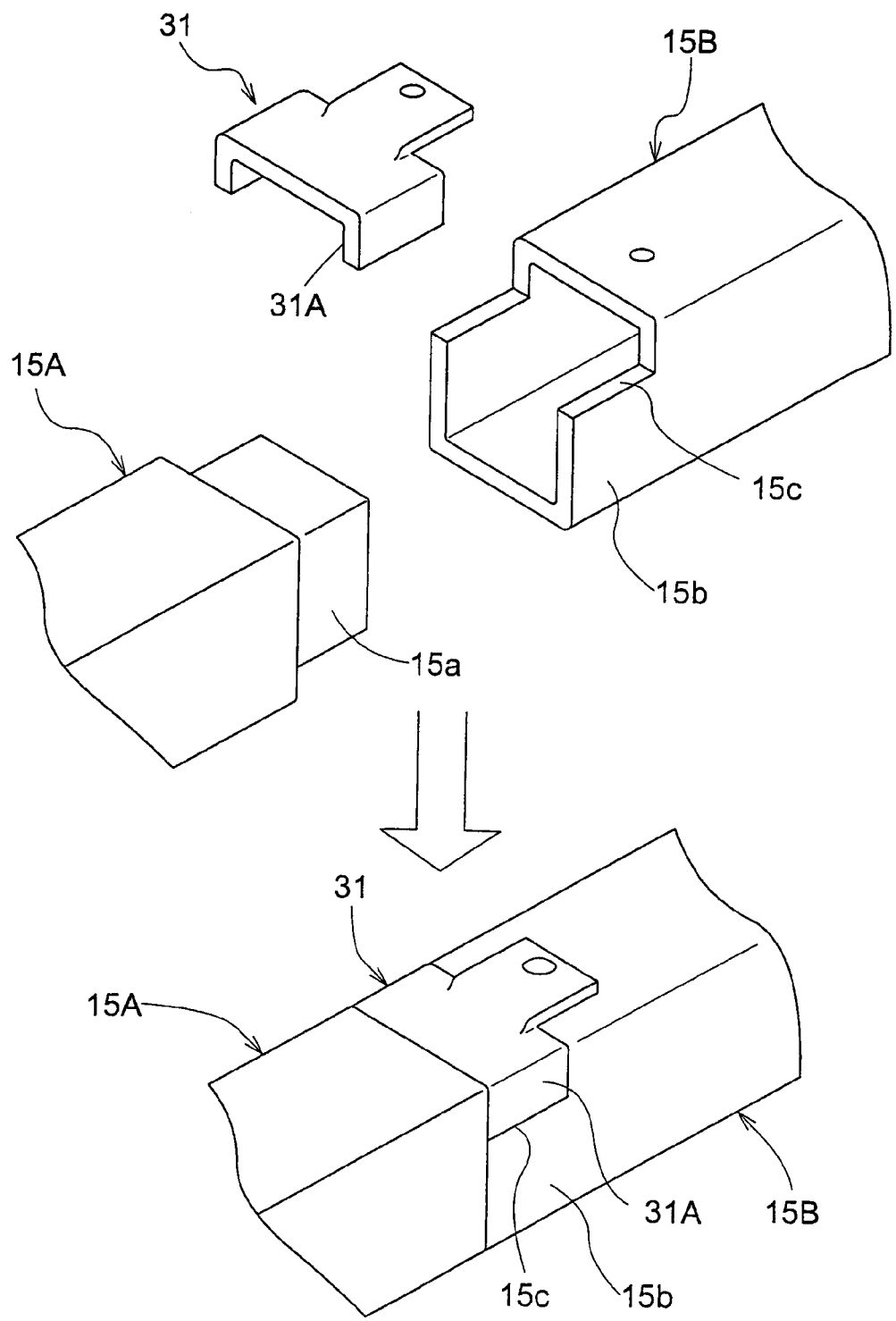
FIG. 10 is a perspective view showing a connecting construction between a forward air-conditioning duct and a rear air-conditioning duct.

As shown in FIG. 3 and FIG. 10, the air-conditioning unit housing 30 is provided for the air-conditioning unit A for effecting the heat exchange of air with the heater 21 and then guiding the conditioned air to the right and left sides on the forward side of the vehicle body, and to the front end of this air-conditioning unit housing 30, the forward air-conditioning duct 15A is attached. The outlets 15a for the conditioned air from the forward air-conditioning duct 15 are formed angularly cylindrical.

Similarly, an upper face of each of the front inlets 15b of the lateral air-conditioning ducts 15B, 15B is formed angularly cylindrical. And, a portion of this upper face is cut away to form a cutout 15c. With the formation of this cutout 15c, by the lateral air-conditioning duct 15B is lifted up via the cutout 15c, the portion of the outlet 15a of the forward air-conditioning duct 15A is engaged within the front inlet 15b of the lateral air-conditioning duct 15B. Then, under this engaged condition, a cover member 31 having the same shape as the cutout 15a is fitted thereon to clamp the lateral wall of forward air-conditioning duct 15A from the outside and rivet-fixed on the upper face of the lateral air-conditioning duct 15B. In this way, the lateral air-conditioning duct 15B can be attached by the insertion and can be engaged with the vertical movement. Hence, with this connecting construction, the risk of air leak is reduced.

As shown in FIGS. 2 and 5, the right and left lateral air-conditioning ducts 15B, 15B are attached with a connecting stay 32 for interconnecting the upper faces of these ducts, so that the stay serves to fix the ducts in position and also to reinforce them. The right and left lateral air-conditioning ducts 15B, 15B are fixed as being vertically bound between the side storage portions 16 and the outer roof portion 13. Though not shown in FIG. 5, between the downward oriented face of the outer roof portion and the lateral air-conditioning duct 15B, there is interposed a heat insulating member covering the air-conditioning duct and filing the gap. These air-conditioning ducts 15A, 15B are formed of resin, which does not allow e.g. welding. Hence, the vertical binding construction is effective. Further, as the right and left lateral air-conditioning ducts 15B, 15B are interconnected by the connecting stay 32, the vertical binding construction is sufficient for fixing.

The positional relationship between the air-conditioning unit A and the forward air-supply openings 25, 25 may alternatively be as follows.

In the air-conditioning unit A, the heater 21 may be disposed rearwardly or laterally of the evaporator 20. Further, this unit A may incorporate such components as the compressor, the expansion valve, the condenser and may be housed within the lower ceiling portion 17. In this case, the forward air-supply openings 25 should be disposed laterally of the air-conditioning unit A.

Next, the positional relationship between the rear side window (an example of "windows") 4 and the rear eaves portion 13A formed in the outer roof portion 13 will be described.

Figure 11:
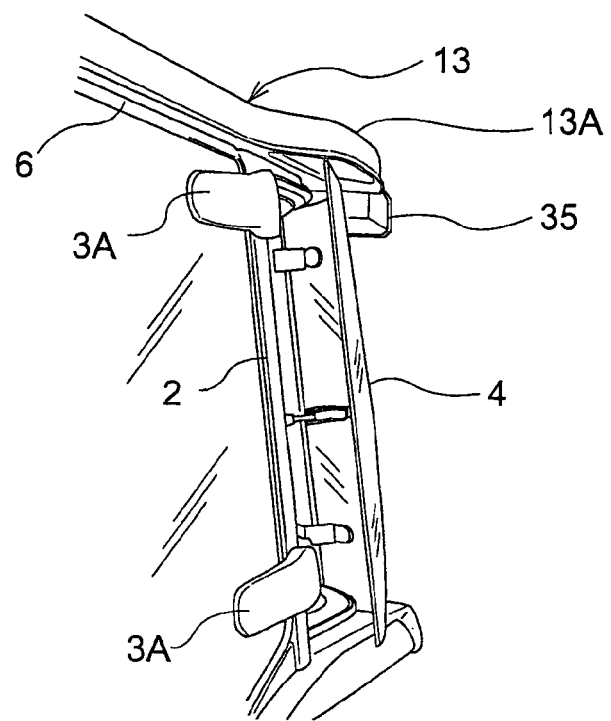
FIG. 11 is a perspective view showing positional relationship among a rear window, lamps and eaves portions.
Figure 12:
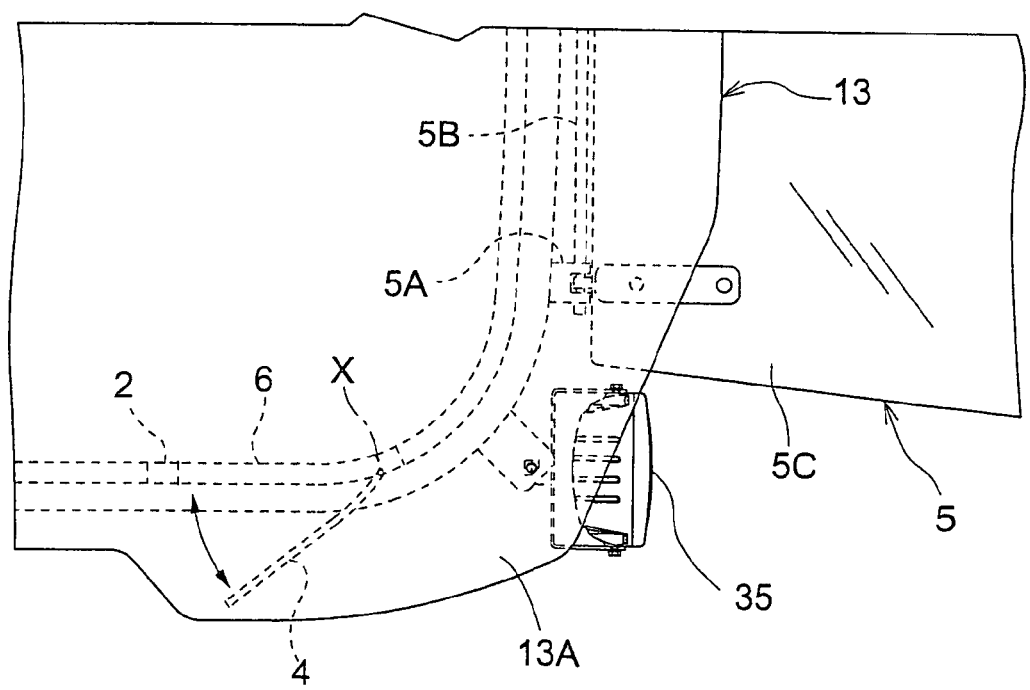
FIG. 12 is a perspective view showing positional relationship among the rear window, the lamps and the eaves portions.

As shown in FIGS. 11 and 12, the rear side window 4 is formed of a transparent glass sheet and a front side of this window can be pivotally opened to the outside about a vertical axis X by means of hinges provided on the rear side thereof. The above-described rear eaves portion 13A has its right and left ends projecting also more laterally outer side than the upper frame 6 so that this eaves portion 13A may be located above the window 4 even when this window 4 is opened by its maximum opening degree.

In this way, as the rear eaves portion 13A extends in the lateral direction also, raindrops or the like will hardly enter the cabin even when the rear side window 4 is opened to the outside for the purpose of e.g. ventilation, visual confirmation of the area around the rear wheels, etc.

As shown in FIGS. 11 and 12, under the rear eaves portion 13A projecting laterally above the rear side window 4, arranged a pair of right and left rearward-oriented lamps 36 are attached to the upper frame 6. As these lamps 35, 35 are disposed with a large right/left distance therebetween corresponding to the projecting amounts of the eaves portion 13A, the lamps can illuminate a large area. Between these right and left rearward-oriented lamps 35, 35, there is provided the rear window 5. Referring to this rear window 5, a bracket 5A attached to the upper frame 6 supports a pivot shaft 5B and a window glass sheet 5C is suspended from and fixed to this pivot shaft 5B. With this construction, the rear window 5 can be pivotally opened rearward and upward. As the right and left rearward-oriented lamps 35, 35 are disposed with the large distance therebetween, the opening/closing construction of the rear window 5 can be easily realized.

In the foregoing embodiment, the work-vehicle cabin having an air-conditioning unit relating to the present invention is applied to an agricultural tractor. Instead, the invention may be applied to other kinds of agricultural or industrial work vehicle such as combined harvester, a construction work vehicle, etc.

The invention claimed is:

1. A work-vehicle cabin having an air-conditioning unit, comprising:
   a roof unit, wherein said roof unit includes an inner roof portion located on the under side and an outer roof portion located on the outer side of the inner roof portion, the roof unit includes on a lateral side thereof a lateral air-supply opening for feeding the conditioned air to the inside of the cabin and a lateral air-conditioning duct for guiding the conditioned air to the lateral air-supply opening bound between the inner roof portion and the outer roof portion;
   a downwardly bulging ceiling portion constituting a part of the roof unit;
   a heater provided in the ceiling portion;
   an evaporator provided in the ceiling portion and arranged adjacently rearwardly of the heater; and
   a pair of forward air-supply openings provided in the ceiling portion and respectively disposed laterally of the heater for feeding conditioned air to the inside of the cabin,
   wherein forwardly of the lateral air-conditioning duct, there is provided a forward air-conditioning duct for guiding the conditioned air from the air-conditioning unit, a feeding portion of the forward air-conditioning duct and a forward receiving portion of the lateral air-conditioning duct are respectively formed as cylindrical portions, a cutout is formed at a leading end of a large-diameter one of the cylindrical portions of the feeding portion of the forward air-conditioning duct and the forward receiving portion of the lateral air-conditioning duct, the small-diameter one of the cylindrical portions of the feeding portion of the forward air-conditioning duct and the forward receiving portion of the lateral air-conditioning duct is inserted and engaged into the other large-diameter cylindrical portion, and a cover member for covering said cutout fixes said feeding portion or said forward introducing portion acting as said large-diameter cylindrical portion under said inserted engaged condition.

2. A work-vehicle cabin having an air-conditioning unit, comprising:
   an air communicating passage for guiding air introduced through an outdoor air introducing opening to the air-conditioning unit;
   an air-supply opening for feeding conditioned air conditioned by the air-conditioning unit to the inside of the cabin;
   an air circulating opening communicating between the inside of the cabin and the air communicating passage, air inside the cabin being introduced through the air circulating opening to the air communicating passage and then conditioned by the air-conditioning unit, which then returns the conditioned air through the air-supply opening to the inside of the cabin;
   an indoor/outdoor air switchover damper for selectively providing a first condition in which the damper closes said air circulating opening for guiding the outdoor air introduced through the outdoor air introducing opening to the air-conditioning unit via the air circulating passage and a second condition in which the damper opens said air circulating opening and blocks air from said outdoor air introducing opening for inhibiting introduction of the outdoor air into the air circulating passage;
   said indoor/outdoor air switchover damper including;
      a shielding portion which can be gaplessly attached to an opening edge of at least said air circulating opening and which is elastically deformable, said shielding portion having elasticity that allows said shielding portion to elastically deform when a door of said work-vehicle is opened and shut, wherein the shielding portion has a first surface that abuts a peripheral area of the air-circulating passage to seal the air-circulating passage when the indoor/outdoor air switchover damper is in the first condition, and a second surface, formed on an opposite side of the first surface, that blocks the air communicating passage when the indoor/outdoor air switchover damper is in the second condition; and
      a pivotable base end portion for supporting the shielding portion; and
   a switchover mechanism for switching over the indoor/outdoor switchover damper between said first condition and said second condition.

3. The work-vehicle cabin according to claim 2, wherein said shielding portion comprises an assembly of a plurality of rubber plates affixed to each other, leading ends and base ends of the rubber plates being bonded together, intermediate portions between the leading ends and the base ends thereof being un-bonded.

4. The work-vehicle cabin according to claim 2, wherein said shielding portion comprises an assembly of a plurality of rubber plates affixed to each other, base ends of the rubber plates being bonded together, leading ends thereof being un-bonded.

5. The work-vehicle cabin according to claim 2, wherein said shielding portion comprises a single rubber sponge plate.

6. The work-vehicle cabin according to claim 2, wherein a detent mechanism is provided at said base end portion for setting an opening condition of the shielding portion.

7. The work-vehicle cabin according to claim 2, wherein at the base end portion, there are provided a manual switchover lever as a switchover control mechanism and a detent mechanism having an engaging recess.

8. The work-vehicle cabin according to claim 7, wherein the detent mechanism includes a ball member capable of engaging the engaging recess and a spring that urges the ball member toward the engaging recess.

9. The work-vehicle cabin according to claim 2, further comprising a lateral air-conditioning duct communicating the air-conditioning unit with the air-supply opening, wherein at least a part of said air communicating passage is located above the lateral air-conditioning duct.

10. The work-vehicle cabin according to claim 9, wherein the air communicating passage spans substantially the entire lateral width of an inner roof portion and extends forwardly at least to the air-conditioning unit.

11. The work-vehicle cabin according to claim 9, wherein the lateral air-conditioning duct extends in a fore and aft direction near a lateral end of an inner roof portion, and wherein the air communicating passage covers substantially an entire upper surface of the lateral air-conditioning duct.

12. The work-vehicle cabin according to claim 2, wherein a value obtained by dividing a fore and aft length of the shielding portion by a fore and aft length of the base portion is greater than ¼.

13. The work-vehicle cabin according to claim 12, wherein a value obtained by dividing a fore and aft length of the shielding portion by a fore and aft length of the base portion is greater than ⅓.

14. The work-vehicle cabin according to claim 2, wherein said shielding portion has a plurality of rubber plates.

15. The work-vehicle cabin according to claim 2, wherein the fore and aft length of the shielding portion is less than the fore and aft length of the base portion.

16. A work-vehicle cabin having an air-conditioning unit, comprising:
    a roof unit;
    a downwardly-bulging ceiling portion constituting a part of the roof unit, the ceiling portion located in a forward region of the cabin;
    a partition wall that is provided to the ceiling portion and that separates conditioned air from unconditioned air;
    a heater provided in the ceiling portion, wherein at least a part of said heater is positioned forwardly of a forward wall of the partition wall and feeds conditioned air forwardly of the partition wall;
    an evaporator provided in the ceiling portion and arranged adjacently rearwardly of the heater; and
    a pair of forward air-supply openings provided forwardly of the partition wall in the ceiling portion and respectively disposed laterally of the heater for allowing conditioned air to be fed to the inside of the cabin.

17. The work-vehicle cabin according to claim 16, wherein the heater is attached to the partition wall such that the entire heater is located forwardly of the partition wall.

18. A work-vehicle cabin having an air-conditioning unit, comprising:
    a roof unit having a side edge extending in a fore and aft direction;
    a ceiling portion constituting a part of said roof unit;
    right and left side portions;
    an openable window provided at one of said right and left side portions, said windows being openable to the outer side, wherein the openable window is pivotable about a vertical axis located at a rear of the openable window such that a forward edge of the openable window can open laterally;
    an eaves portion formed as a lateral extension of said roof unit, said eaves portion projecting laterally with respect to the side edge for covering said openable window from above when the window is opened;
    a heater provided in said ceiling portion;
    an evaporator provided in said ceiling portion; and
    a forward air-supply opening provided in said ceiling portion for feeding conditioned air to the inside of the cabin.

19. The work-vehicle cabin according to claim 18, wherein the openable window stays within an outer edge of the eaves portion in plan view when the openable window is opened to its maximum degree.

20. A work-vehicle cabin having a rear window and an air-conditioning unit, comprising:
    a roof unit;
    a downwardly bulging ceiling portion constituting a part of the roof unit, the ceiling portion located in a forward region of the cabin;
    a heater provided in the ceiling portion;
    an evaporator provided in the ceiling portion and arranged adjacently rearwardly of the heater;
    a pair of forward air-supply openings provided in the ceiling portion and respectively disposed close to and on either side of the heater for allowing conditioned air to be fed to the inside of the cabin, and
    a partition wall in the ceiling portion, the partition wall having a first major surface facing the rear window of the work-vehicle cabin and an opposite second major surface, wherein the evaporator is on the side of the partition wall having the first major surface and the heater and pair of forward air-supply openings are on the side of the partition wall having the second major surface.

* * * * *

UNITED STATES PATENT AND TRADEMARK OFFICE
CERTIFICATE OF CORRECTION

PATENT NO. : 7,252,585 B2
APPLICATION NO. : 10/796800
DATED : August 7, 2007
INVENTOR(S) : Ichikawa et al.

Page 1 of 1

It is certified that error appears in the above-identified patent and that said Letters Patent is hereby corrected as shown below:

<u>Column 11</u>, Line 34, Claim 1, "on the under side" should read -- on the inner side --

Signed and Sealed this

Twenty-seventh Day of November, 2007

JON W. DUDAS
*Director of the United States Patent and Trademark Office*